(12) United States Patent
Matsukuma et al.

(10) Patent No.: US 7,405,491 B2
(45) Date of Patent: Jul. 29, 2008

(54) ELECTRIC POWER GENERATING DEVICE

(75) Inventors: Masaki Matsukuma, Kako-gun (JP);
Yasuo Fukushima, Osaka (JP);
Toshikazu Miyaji, Takasago (JP);
Katsuhiro Uehara, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 43 days.

(21) Appl. No.: 11/456,429

(22) Filed: Jul. 10, 2006

(65) Prior Publication Data

US 2007/0035137 A1    Feb. 15, 2007

(30) Foreign Application Priority Data

Aug. 11, 2005    (JP)    ............... 2005-233597

(51) Int. Cl.
    *F01D 15/10*    (2006.01)
(52) U.S. Cl. ............... 290/52; 310/54; 310/58
(58) Field of Classification Search ............ 290/52, 290/31, 34, 51; 310/54, 58, 63; 60/625, 60/39.3
    See application file for complete search history.

(56) References Cited

U.S. PATENT DOCUMENTS

| | | | | |
|---|---|---|---|---|
| 2,495,745 A | * | 1/1950 | Lintton | 290/52 |
| 3,061,733 A | * | 10/1962 | Humpal | 290/2 |
| 3,796,045 A | * | 3/1974 | Foster-Pegg | 60/772 |
| 3,936,651 A | * | 2/1976 | Abolins et al. | 390/1 R |
| 4,311,917 A | * | 1/1982 | Hencey et al. | 290/1 A |
| 4,394,582 A | * | 7/1983 | Kreissl et al. | 290/4 C |
| 4,682,068 A | * | 7/1987 | Cotzas et al. | 310/198 |
| 4,753,079 A | * | 6/1988 | Sumitomo | 60/676 |
| 6,798,079 B2 | * | 9/2004 | Nelson et al. | 290/2 |
| 2002/0153796 A1 | * | 10/2002 | Yoshinaga et al. | 310/156.48 |

FOREIGN PATENT DOCUMENTS

| | | |
|---|---|---|
| JP | 2000-170548 | 6/2000 |
| JP | 2002-84795 | 3/2002 |

* cited by examiner

*Primary Examiner*—Julio Gonzalez
(74) *Attorney, Agent, or Firm*—Oblon, Spivak, McClelland, Maier & Neustadt, P.C.

(57) ABSTRACT

There is provided an electric power generating device which includes a generator which is constituted by an interior permanent magnet (IPM) synchronous generator, and is connected to a steam turbine without interposition of a reduction gear, cooling means which flows a liquid coolant used to cool the generator, and a frequency converter which converts an electric power generated by the generator into an electric power at a commercial frequency, and outputs the converted electric power, the cooling means includes a circulation passage to which a tank which is used to store the liquid coolant (oil), a cooler which cools the liquid coolant, and a pump which pressure-feeds the liquid coolant are connected, and through which the liquid coolant circulates, and this configuration enables the generator to operate at a high rotational speed, thereby efficiently utilizing the steam energy.

8 Claims, 4 Drawing Sheets

ELECTRIC POWER GENERATING DEVICE

BACKGROUND OF THE INVENTION

1. Field of the Invention

The present invention relates to a power generating device which drives a generator by means of a driving device driven by steam.

2. Description of the Prior Art

In order to interconnect a power generating facility to a system, it is necessary to set the frequency of a generated electric power to a commercial frequency (50 Hz or 60 Hz). For this purpose, when the commercial frequency is 60 Hz, the rotational speed of a generator is set to 3600 rpm.

If a turbine which serves as a driving source of a generator is a gas turbine, the drive torque thereof is determined by the quantity of a fuel gas (or air) supplied thereto, and if the turbine is a steam turbine, the drive torque thereof is determined by the quantity of steam supplied thereto. The drive torque and the load torque of the generator then determine the rotational speed of the generator. However, even if the drive torque of the turbine is sufficiently large, since it is necessary to set the rotational speed of the generator to 3600 rpm as described above, adjusting means which adjusts the amount of the fuel gas or the steam is provided upstream of the turbine, and a reduction gear is provided on a drive shaft of the turbine at the same time.

For example, Japanese Patent Laid-Open No. 2000-1705548 discloses a configuration including a fuel flow rate control valve 120 which adjusts the quantity of a supplied fuel and a reduction gear 122 which reduces a turbine rotational speed as shown in FIG. 3. Namely, air compressed by a compressor 124 is supplied as air for combustion to a combustor 126, and the fuel is also supplied to the combustor 126 via the fuel flow rate control valve 120. There is provided such a configuration that a burnt gas from the combustor 126 is fed to a turbine 128, and rotationally drives the turbine 128, and the rotational speed is reduced by the reduction gear 122 provided on a drive shaft of the turbine 128, thereby driving a generator 130.

On the other hand, Japanese Patent Laid-Open No. 2002-84795 discloses such a configuration that, in an electric power generating device which uses a gas turbine engine 140 as a driving source of a generator 142, an electric power at a frequency higher than the commercial frequency is generated, and the electric power at the high frequency is converted into an electric power at the commercial frequency by a power converter 144, as shown in FIG. 4. Namely, in this power generating device, the generator 142 is constituted by a generator which withstands a high rotational speed, the generator 142 is directly coupled to the gas turbine 140, and the gas turbine 140 is driven at a rotational speed of tens to hundreds of thousand rpm to generate an electric power at a high frequency of approximately 1 to 3 kHz. Then, the electric power at the high frequency is once converted into a DC power by a rectifying circuit 146, and is further converted into an AC output in synchronous with the commercial frequency by an inverter 148 for interconnection to the system.

However, the above conventional power generating devices have the following problems. Namely, the configuration, which adjusts the supplied fuel quantity by means of the fuel flow rate control valve in order to restrict the rotational speed of the generator as disclosed in Japanese Patent Laid-Open No. 2000-170548, poses such a problem that the quantity of the fuel gas fed to the turbine is restricted or the steam is discharged wastefully in some cases, resulting in insufficient use of the energy of the fuel gas or the steam. Moreover, since the configuration according to this publication has the reduction gear 122 to reduce the turbine rotational speed, it is impossible to avoid a mechanical loss caused by the reduction gear 122. Moreover, the employment of the reduction gear 122 poses such a problem that a maintenance thereof requires labors.

On the other hand, according to Japanese Patent Laid-Open No. 2002-84795, since the generator 142 can be operated at the high rotational speed, the fuel gas can be sufficiently utilized, and, moreover, since the generator 142 is directly connected to the gas turbine engine 140, this configuration prevents a mechanical loss from being generated therebetween. However, since the gas turbine engine 140 is configured so as to provide the drive at the high speed of tens to hundreds of thousand rpm, and moreover the gas turbine engine 140 is directly connected to the generator 142, there poses a problem of heat generated by the generator 142, resulting in a incapability of a continuous operation at the high rotational speed.

SUMMARY OF THE INVENTION

The present invention is devised in view of the foregoing problems, and has an objective to efficiently utilize the steam energy so that a generator can continuously operate at a high rotational speed.

To attain the above objective, the present invention provides an electric power generating device including a driving device which is driven by steam, a permanent magnet synchronous generator which is driven by the driving device to generate an electric power, the permanent magnet synchronous generator being connected to the driving device without a reduction gear being interposed, cooling means which circulates a liquid coolant which cools the permanent magnet synchronous generator, and a frequency converter which converts the electric power generated by the permanent magnet synchronous generator to an electric power at a commercial frequency.

According to the present invention, since the electric power generated by the generator is converted by the frequency converter into the electric power at the commercial frequency, it is possible to avoid the restriction on the rotational speed of the generator in order to generate an electric power at a predetermined frequency. As a result, the driving device can be driven at the rotational speed according to the flow rate of the steam supplied to the electric power generating device, resulting in utilizing the steam without a waste. Moreover, since the permanent magnet synchronous generator is used as a generator, it is possible to carry out efficient power generation in a high speed rotation range, and since the driving device and the generator are directly connected without interposition of a reduction gear, the mechanical loss is small therebetween, thereby also contributing to an increase of the efficiency of the electric power generation. Moreover, since the liquid coolant used to cool the permanent magnet synchronous generator is circulated in addition to the employment of the permanent magnet synchronous generator as the generator, it is possible to efficiently restrain the permanent magnet synchronous generator from generating heat. As a result, the permanent magnet synchronous generator can continuously operate at the high rotational speed.

With this configuration, a steam turbine or a screw expander may be used as the driving device.

When the permanent magnet synchronous generator is an interior permanent magnet synchronous generator, it is possible to further restrain the quantity of the heat generated by the generator.

The cooling means preferably comprises a circulation passage to which a tank which stores the liquid coolant, a cooler which cools the liquid coolant, and a pump which pressure-feeds the liquid coolant are connected, thereby circulating the liquid coolant.

With this configuration, since the liquid coolant is circulated while the liquid coolant is being cooled, it is possible to cool the permanent magnet synchronous generator without consuming a large amount of the liquid coolant. Moreover, it is possible to adjust the circulating quantity of the liquid coolant by means of the drive of the pump, and the permanent magnet synchronous generator can thus be properly cooled.

With this configuration, the circulation passage preferably communicates with a cooling passage provided on a body section of a casing of the permanent magnet synchronous generator. As a result, since the permanent magnet synchronous generator is cooled by flowing the liquid coolant through the body section of the casing of the permanent magnet synchronous generator, the permanent magnet synchronous generator can be efficiently cooled.

Then, the cooling passage may be provided through the body section of the casing in peripheral and axial directions. With this configuration, it is possible to deliver the liquid coolant across the inside of the body section of the casing, and thus to evenly cool the permanent magnet synchronous generator.

Moreover, preferably, the electric power generating device according to the present invention further includes a main pipe which leads steam generated by steam generating means to a steam utilizing facility, an inlet pipe which is connected to an inlet side of the driving device, the inlet pipe being connected to the main pipe, and an outlet pipe which is connected to an outlet side of the driving device, the outlet pipe being connected to the main pipe. With this configuration, the steam flowing through the main pipe flows into the inlet pipe, is fed to the driving device, is discharged from the driving device, and returns to the main pipe through the outlet pipe.

With this configuration, since the electric power can be generated by utilizing the steam before the steam is fed to the steam utilizing facility, it is possible to increase the efficiency of the utilization of the steam generated by the steam generating means. Particularly, this configuration is efficient for a case where connections are made to the main pipe connected to a steam utilizing facility which uses steam at a low pressure.

As described above, according to the present invention, since the driving device can be driven at the rotational speed according to the flow rate of the steam supplied to the electric power generating device, and it is also possible to restrain the heat generation of the permanent magnet synchronous generator, the operation of the permanent magnet synchronous generator can be maintained at a high rotational speed. The steam energy can thus be efficiently utilized.

DETAILED DESCRIPTION OF THE PREFERRED EMBODIMENTS

A detailed description will now be given of an embodiment of the present invention with reference to drawings.

Figure 1:
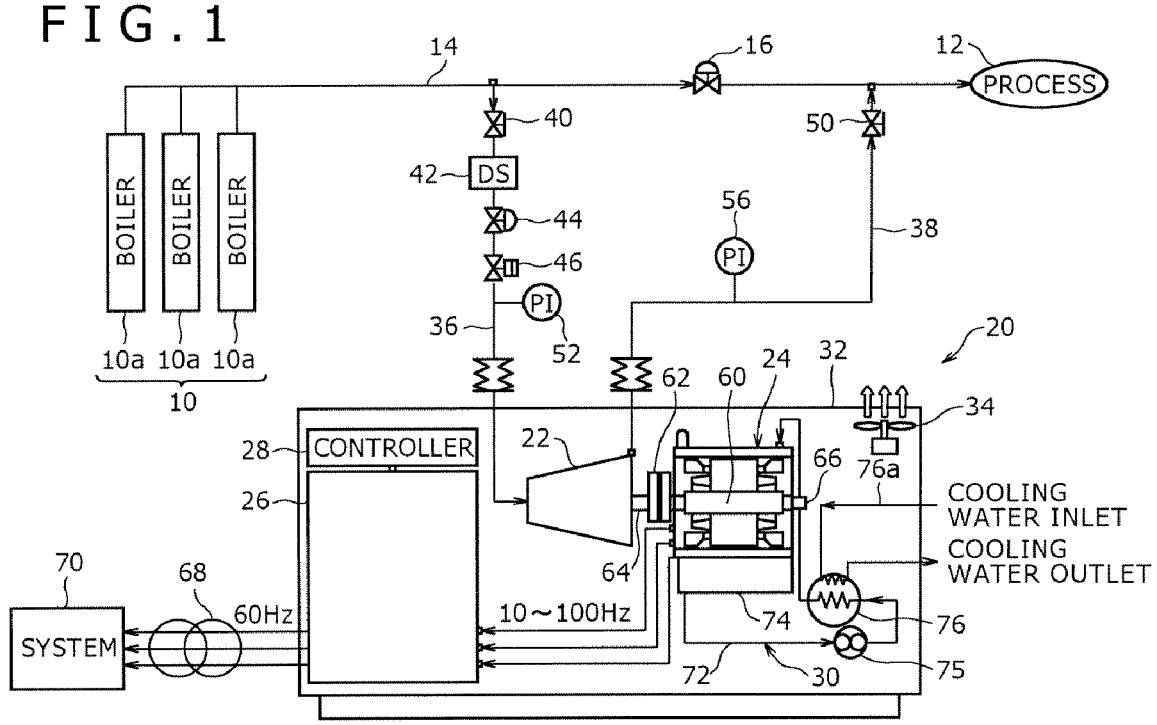
FIG. 1 is a view schematically showing an overall configuration of an electric power generating device according to an embodiment of the present invention.

FIG. 1 shows an embodiment of an electric power generating device 20 according to the present invention. As FIG. 1 shows, the electric power generating device 20 generates an electric power by means of an energy of steam generated by steam generating means 10, and is used by a steam utilizing facility 12. A specific description will now be given.

The steam generating means 10 and the steam utilizing facility 12 are connected with each other by means of a main pipe 14 through which the steam flows. On the main pipe 14 is provided a pressure reducing valve 16.

The steam generating means 10 include multiple boilers 10a connected in parallel to the main pipe 14. As these respective boilers 10a are used boilers which generate a quantity of steam of approximately 2 ton/hour, for example, and the boilers 10a are respectively constituted by a small once-through boiler.

The steam utilizing facility 12 is a facility such as water heater, a space heater, a bath facility, a drying tumbler, a washing facility, a kitchen machine, or a sterilizer, which use steam at approximately 150 to 200° C., for example.

The electric power generating device 20 according to the present embodiment includes a steam turbine 22, a generator 24, a frequency converter 26, a controller 28, and cooling means 30, and are stored in a casing 32. It should be noted a ventilation fan 34 is provided for the casing 32.

The steam turbine 22 is constituted by an axial flow turbine, for example. The steam turbine 22 is selected so that the maximum rotational speed attained by the maximum supplied quantity of the subject steam falls within a permissible range of the rotational speed.

The steam turbine 22 is provided with an inlet pipe 36 which is connected to an inlet side of the steam turbine 22, and an outlet pipe 38 which is connected to an outlet side of the steam turbine 22. The inlet pipe 36 is connected to the upstream side of the pressure reducing valve 16 of the main pile 14, and the outlet pipe 38 is connected to the downstream side of the pressure reducing valve 16 of the main pipe 14. With this configuration, at least a part of the steam generated by the steam generating means 10 is fed to the steam turbine 22, and steam discharged from the steam turbine 22 is returned to the main pipe 14.

On the inlet pipe 36, an open/close valve 40, a drain separator 42, a flow regulating valve 44, and an emergency shutoff valve 46 are sequentially provided from the upstream side. The open/close valve 40 is provided close to a portion connected to the main pipe 14. The drain separator 42 is used to separate a drain from the steam flowing through the inlet pipe 36. The flow regulating valve 44 is used to adjust the flow rate of the steam flowing through the inlet pipe 36, and is controlled to open/close by the controller 28. The emergency shutoff valve 46 is used to completely shut off the inlet pipe 36, and can be controlled by the controller 28.

An open/close valve 50 is provided to the outlet pipe 38 close to a portion connected to the main pipe 14. This open/close valve 50 and the open/close valve 40 on the inlet pipe 36 constitute switching means which switches whether the steam flowing through the main pipe 14 is fed to the inlet pipe 36 or not. Namely, when the steam generated by the steam generating means 10 is directly fed to the steam utilizing facility 12, these open/close valves 40 and 50 are closed, and if the electric power generation is carried out using the steam, these open/close valves 40 and 50 are opened. It should be noted that the open/close valves 40 and 50 can be constituted either by an open/close valve which can be switched to two states: fully closed and fully open states, or an open/close valve whose opening is adjustable. Moreover, as the switching means, three-way valves may be provided in place of the open/close valves 40 and 50. In this case, the three-way valves are provided at the portion connecting the main pipe 14 and the inlet pipe 36 with each other, and at the portion connecting the main pipe 14 and the outlet pipe 38 with each other.

On the inlet pipe 36 is provided a pressure sensor 52 which detects the pressure of the steam fed to the steam turbine 22. On the outlet pipe 38 is provided a pressure sensor 56 which detects the pressure of the steam discharged from the steam turbine 22.

A rotation shaft 60 of the generator 24 is coupled to a drive shaft 64 of the steam turbine 22 via a coupling 62. Namely, the rotation shaft 60 of the generator 24 is connected to the drive shaft 64 of the steam turbine 22 without interposition of a reduction gear. As a result, the operational rotational speed of the generator 24 is equal to the rotational speed of the steam turbine 22.

The electric power generated by the generator 24 is fed to the frequency converter 26. The frequency converter 26 is used to convert the frequency of the electric power generated by the generator 24, and converts an electric power at 10 to 100 Hz to an electric power at the commercial frequency of 60 Hz, for example. A pulse generator 66 is provided on the rotation shaft 60 of the generator 24, and the frequency converter 26 provides switching control of internal elements according to an output value of the pulse generator 66, thereby converting the AC to a DC. Then, the frequency generator 26 converts the electric power of this DC into the electric power at the commercial frequency. The electric power output from the frequency converter 26 is interconnected with a system 70 via a transformer 68.

The controller 28 determines a proper rotational speed based on the detection signals from the pressure sensors 52 and 56. Namely, the relationship between the steam flow rate and the proper rotational speed is approximated as a first order proportional relationship, and, thus, the controller 28 determines the flow rate of the steam supplied to the steam turbine 22 based on the detection values from the pressure sensors 52 and 56 respectively provided upstream and downstream of the steam turbine 22, and then determines the proper rotational speed based on this steam flow rate. The frequency converter 26 outputs a rotational speed control signal to the generator 24 based on the proper rotational speed determined by the controller 28. As a result, the generator 24 is operated at the proper rotational speed based on the steam flow rate.

The cooling means 30 is used to cool the generator 24, and includes a circulation passage 72 through which the liquid coolant circulates. On the circulation passage 72 are provided a liquid coolant tank 74, a pump 75, and a cooler 76. The liquid coolant tank 74 is used to store the liquid coolant. The pump 75 is used to pressure-feed the liquid coolant in the liquid coolant tank 74, and the pump 75 is thus driven so as to circulate the liquid coolant through the circulation passage 72. The cooler 76 is used to cool the liquid coolant fed to the generator 24, and is provided with a cooling water passage 76a used to flow cooling water, and the cooling water flowing through the cooling water passage 76a cools the liquid coolant. Oil is used as the liquid coolant, for example.

Figure 2:
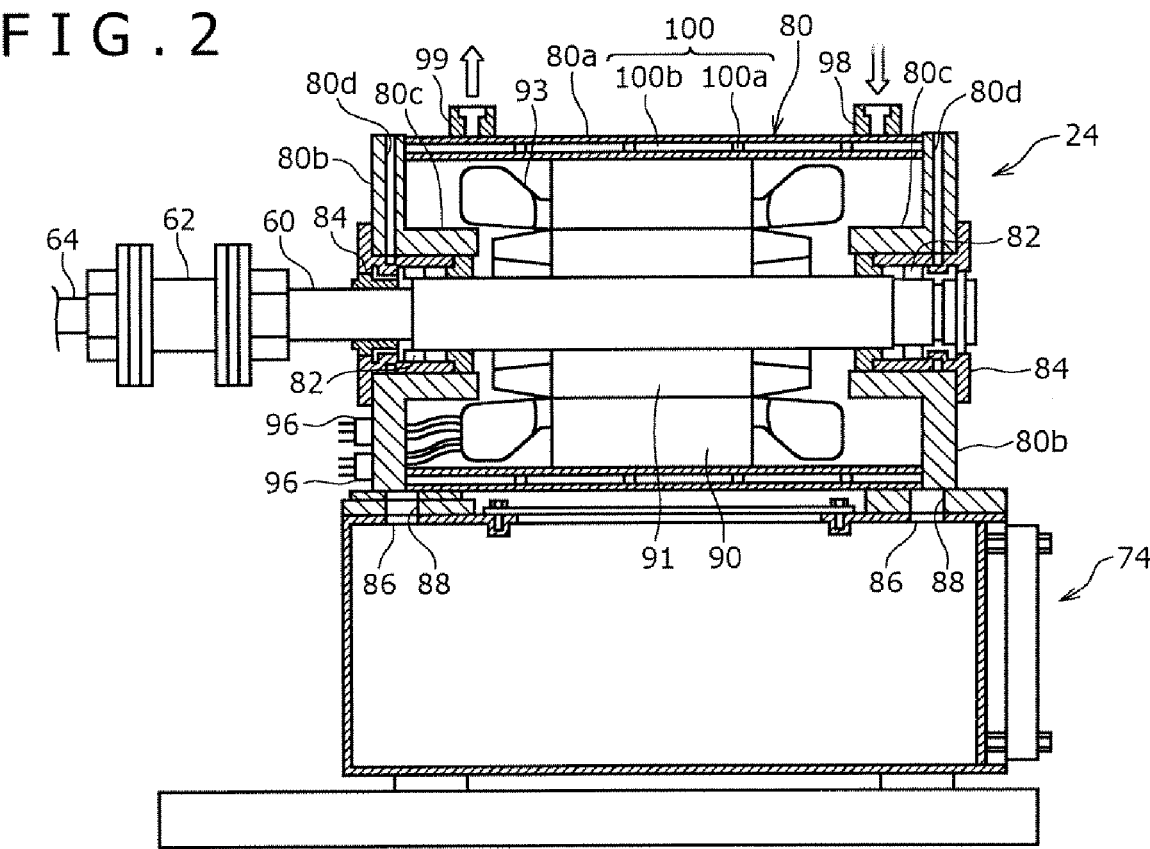
FIG. 2 is a cross sectional view showing a generator and a liquid coolant tank provided for the electric power generating device.
Figure 3:
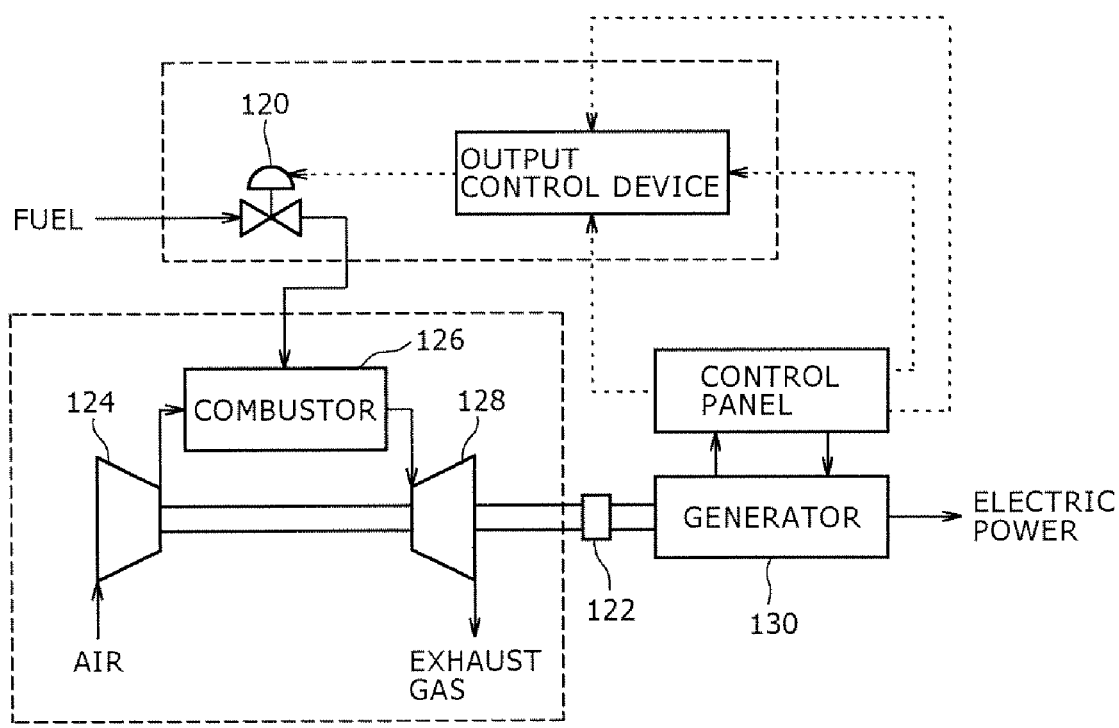
FIG. 3 is a view showing a configuration of a conventional power generating device.
Figure 4:
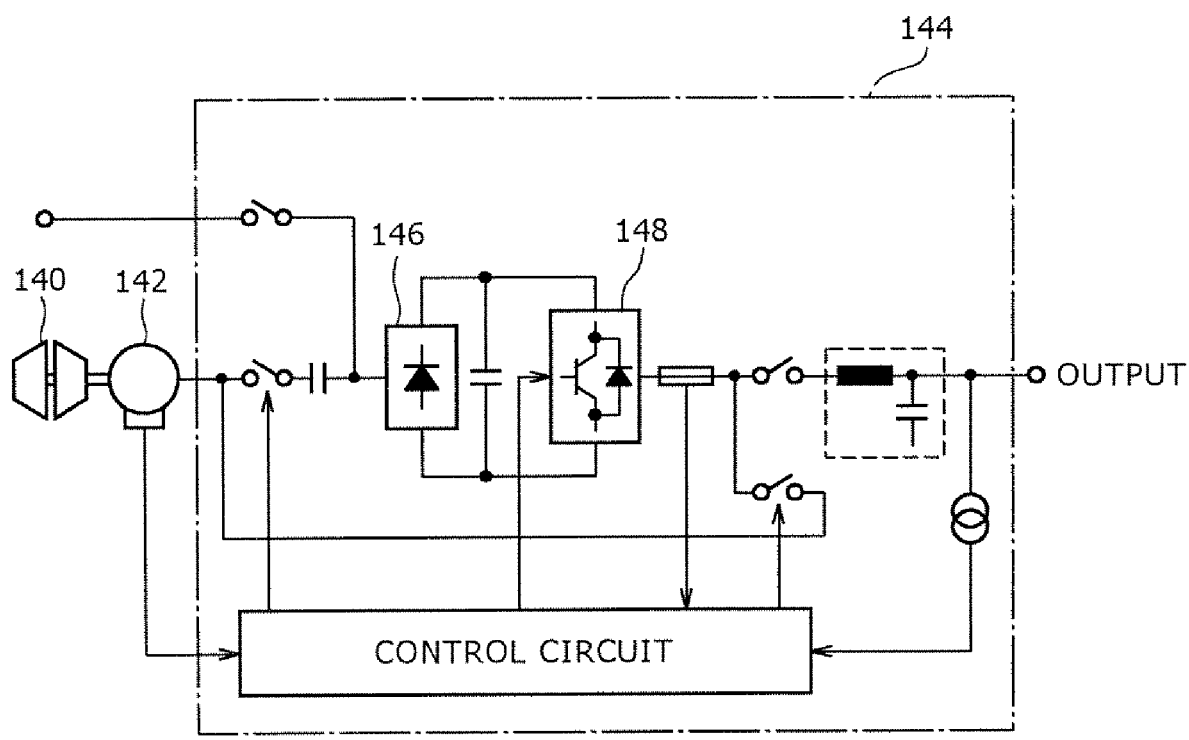
FIG. 4 is a view showing a configuration of a conventional power generating device.

The generator 24 includes a generator casing 80 having a body section 80a formed approximately into a cylinder, and end wall sections 80b provided on both ends of the body section 80a as shown in FIG. 2, and is disposed on the liquid coolant tank 74 so that the axial direction of the body section 80a is horizontal. Bosses 80c in a cylindrical shape protruding inward are respectively provided on both the end wall sections 80b of the generator casing 80, and the rotation shaft 60 passes through both the boss sections 80c. Bearings 82 are respectively provided on the boss sections 80c causing the rotation shaft 60 to freely rotate.

The rotation shaft 60 is disposed to extend horizontally, extends outward from one of the boss sections 80c (one on the left side in FIG. 2), and is coupled to the drive shaft 64 of the steam turbine 22 via the coupling 62.

On the end wall sections 80b of the generator casing 80 are respectively formed oil supply holes 80d which extend from a top end section of the generator casing 80 toward the inside of the respective boss sections 80c. Lubricating oil is supplied to the bearings 82 through the oil supply holes 80d. Shaft seal sections 84 are respectively provided axially outside the bearings 82 in the boss sections 80c to prevent the lubricating oil for the bearings 82 from leaking outside. On the other hand, on a bottom section of the generator casing 80 are provided communication passages 88 which cause the inside of the generator casing 80 and the top openings 86 of the liquid coolant tank 74 to communicate with each other, and the lubricating oil which flows out from the inside of the boss sections 80c into the generator casing 80 flows down into the liquid coolant tank 74 through the communication passages 88. Namely, the lubricating oil is the same as the oil used as the liquid coolant. It should be noted that, in place of the configuration to form the communication passages 88 in the generator casing 80, there may be provided such a configuration that pipes extend outward from the bottom end section of the generator casing 80 (not shown), and extreme ends of the pipes are respectively connected to the liquid coolant tank 74.

The generator 24 is constituted by an interior permanent magnet (IPM) synchronous generator. Namely, a stator 90 is fixed to the body section 80a of the generator casing 80, and a rotor 91 is provided on an inner periphery side of the stator 90. Inside the rotor 91 is embedded a permanent magnet (not shown), and the rotor 91 is fixed to the rotation shaft 60. It should be noted that the generator 24 is selected such that the maximum rotational speed of the steam turbine 22 falls within the permissible rotational speed.

A coil 93 is wound on the stator 90, and is connected to an electric equipment port 95. To this electric equipment port 95 are connected wires connected to the frequency converter 26. On the coil 93 is provided a temperature sensor, which is not shown, and the temperature sensor is connected to the electric equipment port 96. To this electric equipment port 96 are connected wires connected to the controller 28.

On the body section 80a of the generator casing 80 are provided an inlet port 98 and an outlet port 99, and the inlet port 98 and the outlet port 99 are connected with each other by a cooling passage 100 formed in the body section 80a. The inlet port 98 is provided on one side of the body section 80a, and an end of the cooler 76 side in the circulation passage 72 is connected thereto. On the other hand, the outlet port 99 is provided on the other side of the body section 80a, and an end of the liquid coolant tank 74 side in the circulation passage 72 is connected thereto.

The cooling passage 100 includes multiple peripheral-direction sections 100a which are disposed at an interval in the axial direction, and extend in the peripheral direction in the body section 80a, and an axial-direction section 100b which extends in the axial direction so as to cause the peripheral-direction sections 100a to communicate with each other. Then, the liquid coolant fed through the inlet port 98 flows though the peripheral-direction sections 100a and the axial-direction section 100b toward the outlet port 99. As a result, the body section 80a of the generator casing 80 is evenly cooled.

A description will now be given of the operation of the electric power generating device 20. The steam generated by driving the respective boilers 10a flows through the main pipe 14, is reduced in pressure by the pressure reduction valve 16, and is then fed to the steam utilizing facility 12. Then, when the electric power generation is carried out, the open/close valve 40 on the inlet pipe 36 and the open/close valve 50 on the outlet valve 38 are opened, and, consequently, a part of the steam which has generated by the respective boilers 10a, and has flown through the main tube 14 is diverted to the inlet pipe 36. Even in this case, since the steam is still fed to the steam utilizing facility 12, the steam utilizing facility 12 can utilize the steam.

The steam turbine 22 is driven by the steam diverted to the inlet pipe 36, which causes the rotation shaft 60 of the generator 24 to rotate, resulting in the generation of the electric power. On this occasion, the flow rate of the steam supplied to the steam turbine 22 is obtained by the pressure sensors 52 and 56, and the proper rotational speed under this steam flow rate is obtained by the controller 28. Then, the generator 24 is operated at this proper rotational speed. The steam which has driven the steam turbine 22 merges into the steam, which has flown through the main pipe 14, via the outlet pipe 38, and is supplied to the steam utilizing facility 12. Namely, even if the quantity of the steam used in the steam utilizing facility 12 reduces, since the open/close valves 40 and 50 are opened to use the steam for the electric power generation, it is possible to continuously operate the respective boilers 10a at a state close to the maximum capacity. Therefore, it is possible to stably drive the respective boilers 10a, and to increase the efficiency of the boilers 10a.

During the operation of the generator 24, the temperature inside the generator 24 is detected by the temperature sensor, not shown, and the liquid coolant is circulating through the circulation passage 72. Namely, the drive of the pump 75 causes the liquid coolant in the liquid coolant tank 74 is fed out, the liquid coolant is cooled at the cooler 76 by the cooling water of the cooling water passage 76a, and the cooled liquid coolant is fed to the generator 24. Then, the liquid coolant passes through the inlet port 98, and flows through the peripheral-direction sections 100a and the axial-direction section 100b of the cooling passage 100, thereby evenly cooling the body section 80a of the generator casing 80. As a result, the heat generated by the generator 24 is efficiently restrained. Then, the liquid coolant which has flown through the cooling passage 100 passes the outlet port 99, flows through the circulation passage 72, and returns to the liquid coolant tank 74. The liquid coolant continues this circulation.

The electric power generated by the generator 24 is output to the frequency converter 26 through the electric equipment port 95. The frequency of the electric power is 10 to 100 Hz, for example. Then, the electric power is converted into the electric power at the commercial frequency by the frequency converter 26, is output, and is interconnected to the system 70 via the transformer 68.

As described above, according to the present invention, since the electric power generated by the generator 24 is converted by the frequency converter 26 into the electric power at the commercial frequency, it is possible to avoid the restriction on the rotational speed of the generator 24 in order to generate an electric power at a predetermined frequency. As a result, the steam turbine 22 can be driven at the rotational speed according to the flow rate of the steam supplied to the electric power generating device 20, resulting in utilizing the steam without a waste. Moreover, since the generator 24 is constituted by the permanent magnet synchronous generator, it is possible to carry out efficient power generation in a high speed rotation range, and since the steam turbine 22 and the generator 24 are directly connected without interposition of a reduction gear, the mechanical loss is small therebetween, thereby also contributing to an increase of the efficiency of the electric power generation. Moreover, since the liquid coolant used to cool the generator 24 is circulated in addition to the employment of the permanent magnet synchronous generator as the generator 24, it is possible to efficiently restrain the generator 24 from generating heat. As a result, the generator 24 can continuously operate at the high rotational speed.

Moreover, according to the present embodiment, since the generator 24 is configured by the interior permanent magnet synchronous generator, it is possible to further restrain the generator 24 from generating heat.

Moreover, according to the present embodiment, since the liquid coolant is circulated while the liquid coolant is being cooled, it is possible to cool the generator 24 without consuming a large amount of the liquid coolant, and since it is possible to adjust the circulating quantity of the liquid coolant by means of the drive of the pump 75, the generator 24 can be properly cooled.

Moreover, according to the present embodiment, since the circulation passage 72 of the liquid coolant communicates with the cooling passage 100 provided on the body section 80a of the generator casing 80, the generator 24 can be efficiently cooled. Moreover, since the cooling passage 100 is configured so as to be provided through the body section 80a of the generator casing 80 in peripheral and axial directions, it is possible to deliver the liquid coolant across the inside of the body section 80a of the generator casing 80, and thus to evenly cool the generator 24.

Moreover, since the electric power can be generated by utilizing the steam before the steam is fed to the steam utilizing facility 12, it is possible to increase the efficiency of the utilization of the steam generated by the boiler 10a. Particularly, the configuration is efficient for a case where connections are made to the main pipe 14 connected to the steam utilizing facility 12 which uses steam at a low pressure.

Moreover, though, according to the present embodiment, the steam turbine 22 is constituted by an axial flow turbine, the steam turbine 22 may be constituted by a radial turbine instead.

According to the present invention, any fluid machine may be employed as a driving device used to drive the generator as long as the machine generates a rotational force from a flow of steam. Examples of such a fluid machine include turbine and screw expander. Thus, the steam turbine 22 may be replaced by a screw expander in the embodiment shown in FIG. 1.

What is claimed is:

1. An electric power generating device comprising:
   a driving device that is driven by steam;
   a permanent magnet synchronous generator that is driven by said driving device to generate an electric power, said permanent magnet synchronous generator being connected to said driving device without a reduction gear being interposed;
   cooling means that circulates a liquid coolant used to cool said permanent magnet synchronous generator; and
   a frequency converter that converts the electric power generated by said permanent magnet synchronous generator to an electric power at a commercial frequency.

2. The electric power generating device according to claim 1, wherein said driving device is a steam turbine.

3. The electric power generating device according to claim 1, wherein said driving device is a screw expander.

4. The electric power generating device according to claim 1, wherein said permanent magnet synchronous generator is an interior permanent magnet synchronous generator.

5. The electric power generating device according to claim 1, wherein said cooling means comprises a circulation passage to which a tank that stores the liquid coolant, a cooler that cools the liquid coolant, and a pump that pressure-feeds the liquid coolant are connected, thereby circulating the liquid coolant.

6. The electric power generating device according to claim 5, wherein said circulation passage communicates with a cooling passage provided on a body section of a casing of said generator.

7. The electric power generating device according to claim 6, wherein said cooling passage is provided through said body section of said casing in peripheral and axial directions.

8. The electric power generating device according to claim 1 further comprising:

a main pipe that leads steam generated by steam generating means to a steam utilizing facility;

an inlet pipe that is connected to an inlet side of said driving device, said inlet pipe being connected to said main pipe; and an outlet pipe that is connected to an outlet side of said driving device, said outlet pipe being connected to said main pipe, wherein the steam flowing through said main pipe flows into said inlet pipe, is fed to said driving device, is discharged from said driving device, and returns to said main pipe through said outlet pipe.

* * * * *

UNITED STATES PATENT AND TRADEMARK OFFICE
CERTIFICATE OF CORRECTION

PATENT NO. : 7,405,491 B2 Page 1 of 1
APPLICATION NO. : 11/456429
DATED : July 29, 2008
INVENTOR(S) : Matsukuma et al.

It is certified that error appears in the above-identified patent and that said Letters Patent is hereby corrected as shown below:

On the title page, Item (73), the Assignee should read:

-- (73)   Assignee:   Kabushiki Kaisha Kobe Seiko Sho (Kobe Steel, Ltd.), Kobe-shi (JP) --

Signed and Sealed this

Twenty-third Day of September, 2008

JON W. DUDAS
*Director of the United States Patent and Trademark Office*